United States Patent [19]

Kaewell, Jr. et al.

[11] Patent Number: 5,361,046
[45] Date of Patent: Nov. 1, 1994

[54] MODULATOR HAVING FRACTIONAL SAMPLE/SYMBOL TIME

[75] Inventors: John D. Kaewell, Jr., Bensalem; David M. Cooley, Upper Darby, both of Pa.

[73] Assignee: Hughes Aircraft Company, Los Angeles, Calif.

[21] Appl. No.: 995,486

[22] Filed: Dec. 22, 1992

[51] Int. Cl.$^5$ .................... H03C 3/00; H04L 27/00; H04L 27/12; H04L 27/18

[52] U.S. Cl. .................... 332/100; 332/101; 332/103; 332/104; 375/45; 375/52; 375/62; 375/67

[58] Field of Search ........ 332/100, 101, 102, 103–105; 375/45, 52, 62, 67; 331/1 A

[56] References Cited

U.S. PATENT DOCUMENTS

| | | | |
|---|---|---|---|
| 4,962,510 | 10/1990 | McDavid et al. | 375/67 |
| 5,016,259 | 5/1991 | Hershberger | 375/62 |
| 5,022,054 | 6/1991 | Wang | 332/100 X |

Primary Examiner—David Mis
Attorney, Agent, or Firm—Gordon R. Lindeen, III; William J. Streeter; Wanda K. Denson-Low

[57] ABSTRACT

A modulator capable of providing a fractional sample or symbol 995486 time employs a decimation counter (23) responsive to a clock having a frequency equal to M/N×(data symbol clock), where M is an interpolation factor and N is a decimation factor, for generating a data symbol clock to select FSK symbols from a sampled data array (21). A multiplier (26) receives the FSK symbols and multiplies the symbols by a weighting factor determined by the decimation counter. When the decimation counter wraps around due to a modulo M operation, a fractional weight is calculated for the current FSK symbol, then a new FSK symbol is selected, and then a fractional weight is calculated for the new FSK symbol. When the decimation counter has not wrapped, the full weighting, N, is output for the current FSK symbol.

12 Claims, 3 Drawing Sheets

MODULATOR HAVING FRACTIONAL SAMPLE/SYMBOL TIME

BACKGROUND OF THE INVENTION

1. Field of the Invention

The present invention generally relates to digital communications systems and, more particularly, to a digital modulator which can efficiently produce a non-integer number of samples per symbol time. The invention has particular application in digital cellular telecommunications which employ frequency shift keying and quadrature phase shift keying at different rates.

2. Description of the Prior Art

In digital voice communication systems, such as cellular telecommunications, input sample rates can be different from output sampling rates, resulting in a non-integer relationship between the number of input and output samples. As a specific example, in the current U.S. analog cellular telephone standard, the control channel uses a Frequency Shift Keying (FSK) symbol rate of 10 KHz. The new U.S. digital cellular telephone standard EIA/IS-54A (Electronic Industries Association/Interim Standard) adds control signaling using 24.3 K-Symbol/Sec. QPSK (Quadrature Phase Shift Keying) modulation. In this case, it is desired that the same modulator which generates the 10 K-Symbol/sec. FSK modulation also generates the 24.3 K-Symbol/sec. QPSK modulation. This works out to be 2.43 QPSK samples per FSK symbol time.

There are two traditional approaches which could be used to synthesize a modulation waveform which has a non-integer number of samples per symbol time. The first approach would run a Direct Digital Synthesizer (DDS) at a much higher clock rate and then decimate its output to achieve the desired number of samples per symbol time. Another approach would be to generate the modulation with an integer number of samples per symbol time and then interpolate/decimate using appropriate filters to the desired sampling rate.

SUMMARY OF THE INVENTION

It is therefore an object of the present invention to provide an improved digital modulator which efficiently produces a non-integer number of samples per symbol time.

According to the invention, there is provided a digital modulator which improves on the DDS approach to synthesize a modulation waveform which has a non-integer number of samples per symbol time. This new implementation only runs the DDS when a new output sample is needed, versus the more traditional approach of running the DDS at a higher sampling rate and then decimating its output. This invention allows digital modulations to be synthesized which consist of a non-integer number of samples per symbol time in an efficient manner. Being able to produce fractional sample/symbol modulations allows a hardware platform with a fixed Digital-to-Analog (D/A) sampling clock to support modulations with various symbol rates. Also, this modulator only has to run when a new output sample is required by the D/A sampling clock, saving power over a traditional modulator.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
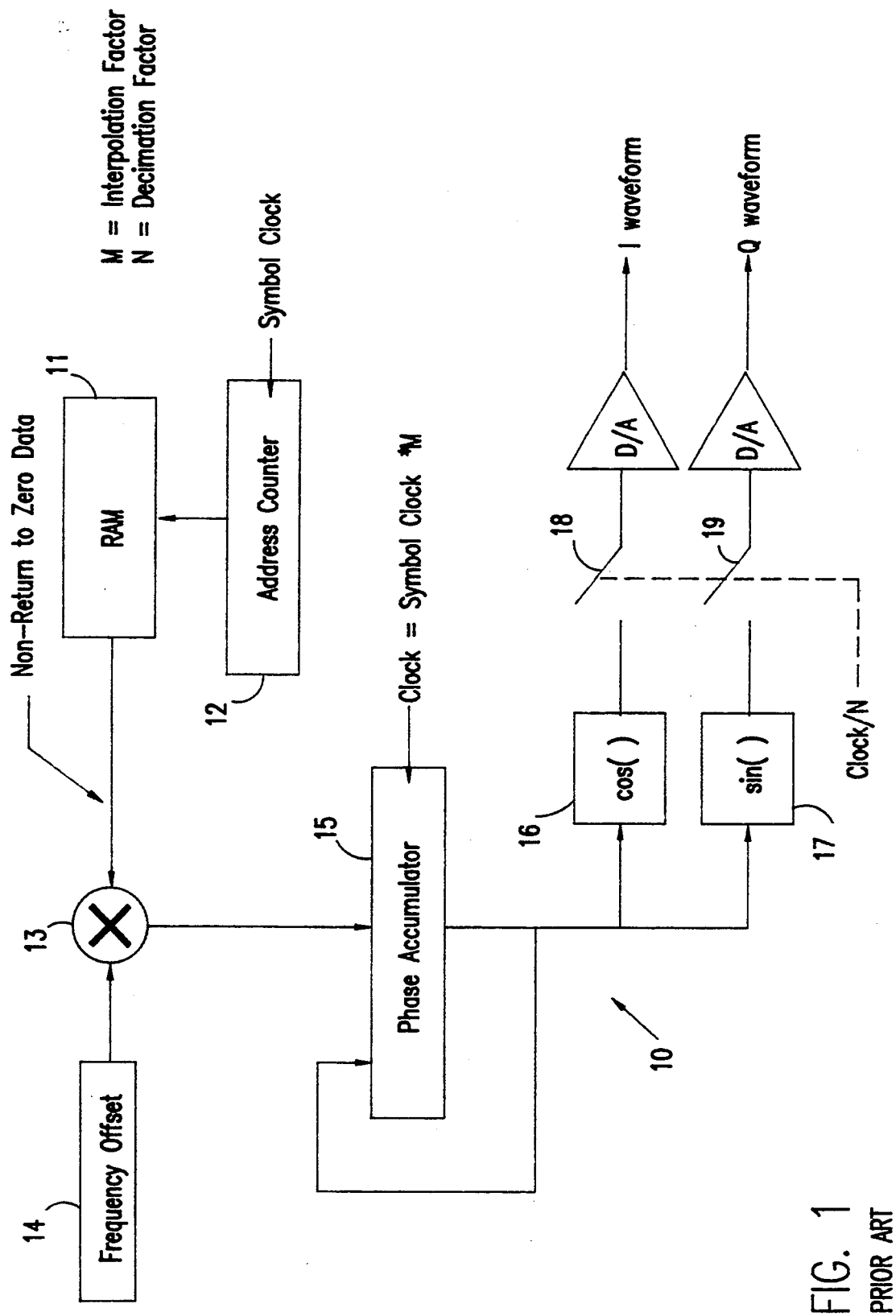
FIG. 1 is a block diagram of a known oversampled-decimated fractional sample/symbol FSK modulator.

Referring now to the drawings, and more particularly to FIG. 1, there is shown a block diagram of an oversampled, decimated fractional sample per symbol FSK modulator, or direct digital synthesizer (DDS) 10. Sampled data previously sorted in the random access memory (RAM) 11 is read out under the control of address counter 12 which, in turn, is incremented by the symbol clock (not shown). The sampled data is non-return to zero (NRZ) data and is applied to mixer 13 which receives a frequency offset signal from source 14 to produce a signal to phase accumulator 15. The phase accumulator 15 is clocked at a frequency equal to the product of the FSK symbol clock and M, the interpolation factor. The output of the phase accumulator 15 is separated into quadrature phases by phase shifters 16 and 17, the outputs of which are applied to respective sampling switches 18 and 19. The final sampling rate is determined by the decimator (not shown) which selects one sample for every N DDS output samples, where N is the decimation factor. The objective of this system is to synthesize a rational M/N sample per symbol FSK waveform.

Figure 2:
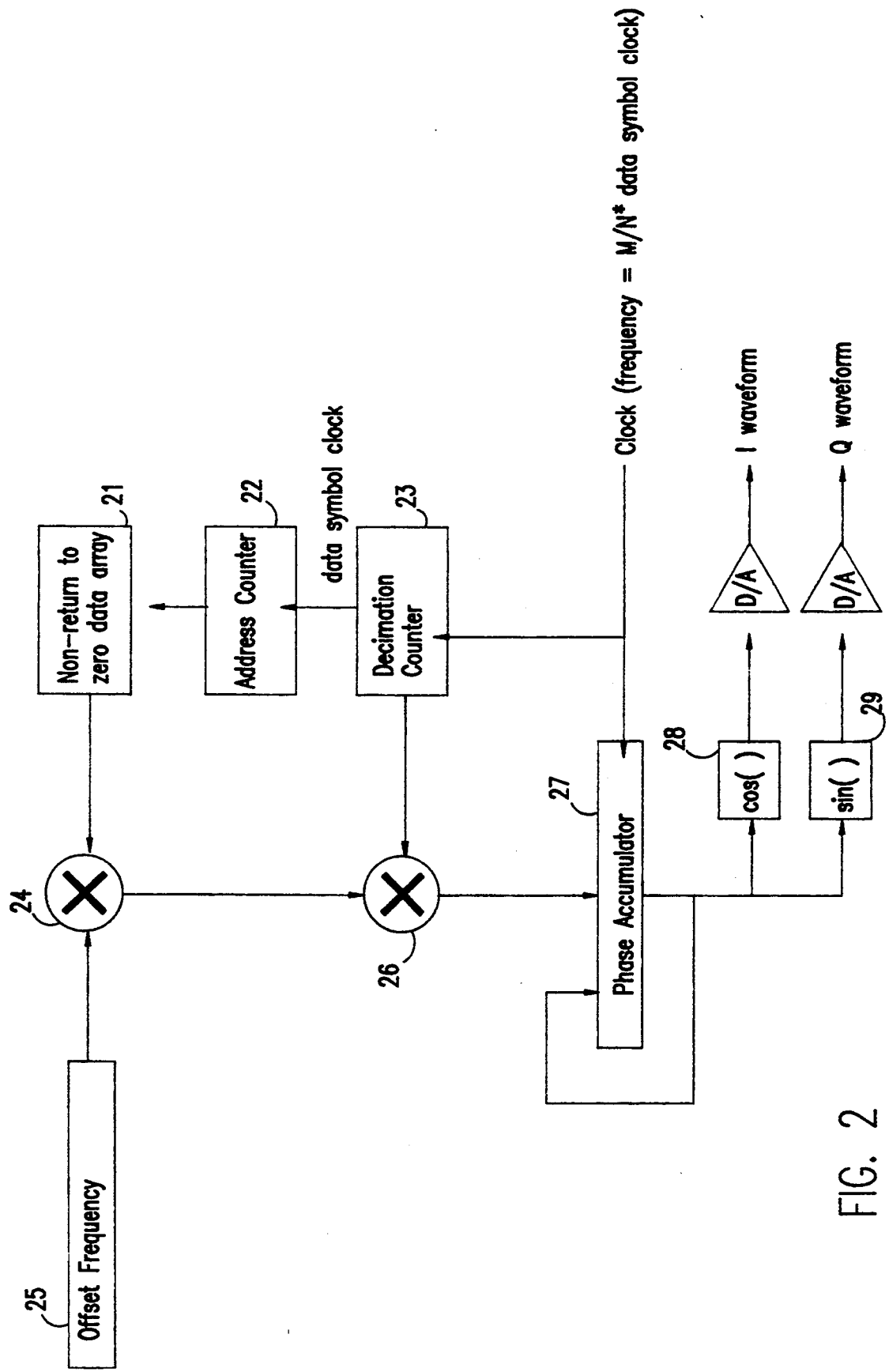
FIG. 2 is a block diagram of the new modulator according to the invention.

A problem with this system is that many operations may need to be performed before an output sample is taken, thus wasting processing resources and power. Shown in FIG. 2 is a more efficient approach to synthesizing a fractional sample per symbol modulation waveform. Sampled NRZ data previously stored in RAM 21 is read out under the control address counter 22 which, in this case, is incremented by the decimation counter 23. The NRZ data from RAM 21 is applied to mixer 24 which receives a frequency offset signal from source 25 to produce a signal to multiplier 26 which receives as its second input an output from decimation counter 23. The phase accumulator 27 receives the output of the multiplier 26 and is clocked at a frequency equal to the M/N×(data symbol clock). The output of the phase accumulator 27 is separated into quadrature phases by phase shifters 28 and 29.

To better understand the invention, consider in more detail the decimator counter 23. For every output sample, the decimation counter 23 determines the appropriate weighting to multiply the current FSK by. The decimation counter 23 is clocked at the output sampling rate; it is incremented by the decimation factor, and it is modulo M, the interpolation factor.

Figure 3:
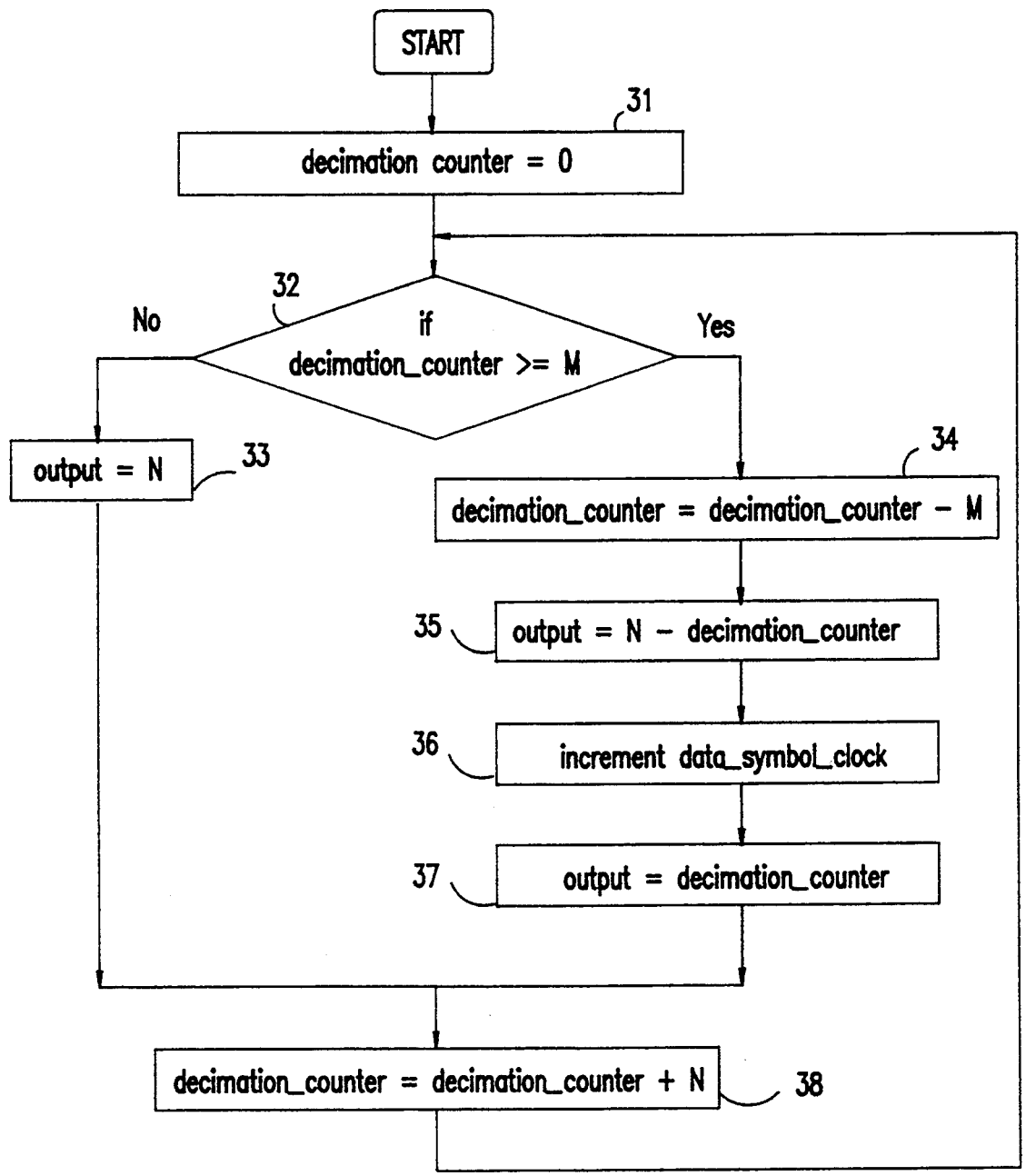
FIG. 3 is a flow diagram illustrating the operation of the decimation counter in the modulator shown in FIG. 2.

Shown in FIG. 3 is a flow chart of the decimation counter operation. The process is initialized by setting the decimation counter to zero in function block 31. The process is a loop headed by decision block 32 where a determination is made as to whether the decimation counter has accumulated a count greater than or equal to M. If not, the fractional weight output to the multiplier 26 is declared to be N in function block 33; otherwise, the decimation counter is set to the current count less M in function block 34. The fractional weight output to multiplier 26 is declared to be N less the content of the decimation counter in function block 35. The data symbol clock to address counter 22 is then incremented in function block 36 to generate the next FSK symbol. The fractional weight output to multiplier 26 for this symbol is taken as the current content of the decimation counter in function block 37. The outputs of both function blocks 33 and 37 are applied to function block 38 where the decimation counter is set to its current count plus N. At this point, the process loops back to decision block 32 to again determine if the content of the decimation counter is greater than or equal to M. Thus, when the decimation counter wraps around due to the modulo M operation, a fractional weight is calculated for the current FSK symbol, then a new FSK symbol is selected, and then a fractional weight is calculated for the new FSK symbol. When the decimation counter has not wrapped, a full weighting, N, is output for the current FSK symbol.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A data symbol modulator comprising:
    a decimation counter clocked at a first clock rate to produce a second clock output at a second clock rate and to determine a weighting factor;
    a data symbol memory coupled to the decimation counter for storing a plurality of addressable data symbols and for providing a sequence of data symbols from the memory at a rate corresponding to the second clock output;
    a multiplier coupled to the memory and the counter for receiving the sequence of data symbols provided by the memory and multiplying each data symbol provided by the memory with a weighting factor from the counter; and
    a phase accumulator coupled to the multiplier for accumulating the products produced by the multiplier and providing accumulated samples at the first clock rate.

2. The modulator of claim 1 further comprising a quadrature phase generator for generating first and second quadrature waveforms from the accumulated data produced by the accumulator.

3. The modulator of claim 1 further comprising an address counter coupled between the decimation counter and the data symbol memory for receiving the second clock output from the decimation counter and for generating addresses at the second clock rate to the data symbol memory in response thereto.

4. The modulator of claim 1 wherein the decimation counter comprises a comparator for comparing the count of the counter with a second factor at the first clock rate, the counter producing a weighting factor at the second clock rate for each data symbol in response to the comparison.

5. The modulator of claim 4 wherein the counter produces a full weighting factor if the count of the counter is less than the second factor and the counter produces a fractional weighting factor if the count of the counter is greater than the second factor.

6. The modulator of claim 5 wherein the decimation counter produces the second clock output based on a decimation factor, wherein the full weighting is equivalent to the decimation factor, and wherein, if the count of the counter is greater than the second factor, the decimator produces a first fractional weighting factor for a first symbol based on a difference between the decimation factor and the count of the decimation counter and a second fractional weighting factor for a second symbol based on the count of the decimation counter.

7. A method for modulating data symbols comprising the steps of:
    applying a first clock rate to a decimation counter;
    incrementing the decimation counter at the first clock rate by a decimation factor, module a second factor, to produce a second clock output at a second clock rate and to determine a weighting factor;
    providing a sequence of data symbols from a data symbol memory at a rate corresponding to the second clock output;
    multiplying each data symbol provided by the memory with a weighting factor from the decimation counter;
    accumulating the products produced in the step of multiplying in an accumulator; and
    applying the first clock rate to the accumulator so that the accumulator produces accumulated data at the first clock rate.

8. The method of claim 7 further comprising the step of generating first and second quadrature waveforms from the accumulated data produced by the accumulator.

9. The method of claim 7 wherein the step of providing a sequence of data symbols comprises the steps of:
    applying the second clock output to an address counter to generate a sequence of memory addresses; and
    applying the sequence of memory addresses to the data symbol memory, the data symbol memory having a plurality of data symbols stored in relationship to addresses, so that the data symbol memory provides a sequence of data symbols;

10. The method of claim 7 wherein the step of determining a weighting factor comprises the steps of:
    comparing the count of the decimation counter to the second factor at the first clock rate; and
    producing a weighting factor for each data symbol at the second clock rate in response to the comparison.

11. The method of claim 10 wherein the step of producing a weighting factor comprises the steps of:
    producing a full weighting if the count of the decimation counter is less than the second factor; and
    producing a fractional weighting if the count of the decimation counter is greater than the second factor.

12. The method of claim 11 wherein the full weighting is equivalent to the decimation factor, and wherein the step of producing a fractional weighting comprises the steps of:
    producing a first fractional weighting for a first symbol based on a difference between the decimation factor and the count of the decimation counter; and
    producing a second fractional weighting for a second symbol based on the count of the decimation counter.

* * * * *